Sept. 12, 1967 F. F. EHRICH 3,341,345
SOLID SOLUTIONS OF A QUINACRIDONE AND
N,N'-DIARYL-DIAMINO COMPOUNDS
Filed Jan. 18, 1966
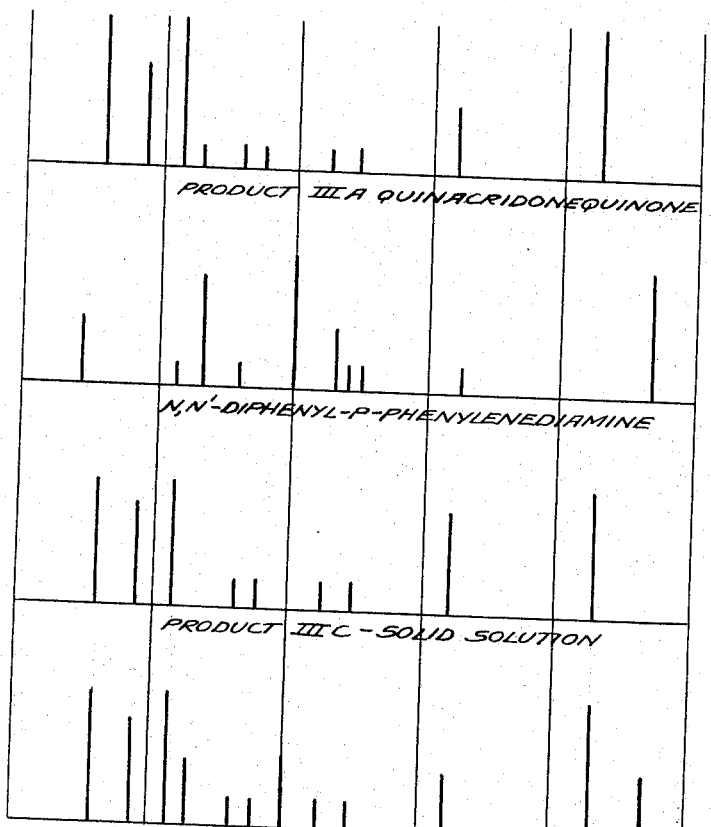
INVENTORS
FELIX FREDERICK EHRICH,
WILLIAM S. STRUVE,
BY David E. Brook
AGENT 3,341,345
SOLID SOLUTIONS OF A QUINACRIDONE AND N,N'-DIARYL-DIAMINO COMPOUNDS
Felix Frederick Ehrich, Westfield, and William S. Struve, Chatham, N.J., assignors to E. I. du Pont de Nemours and Company, Wilmington, Del., a corporation of Delaware
Filed Jan. 18, 1966, Ser. No. 521,311
12 Claims. (Cl. 106—288)

This invention relates to new compositions of matter in the quinacridone series of compounds and more particularly to quinacridone compounds having improved lightfastness and to methods of preparing such compounds.

"Quinacridone" (or linear quinacridone) is the compound represented by the structural formula

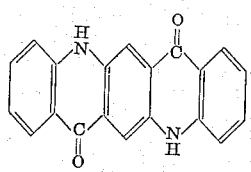

In a broader sense, quinacridone compounds refer to linear quinacridone, which may be substituted, and to both, quinacridonequinone which has the following structural formula

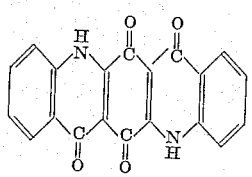

and isoquinacridone which has the structural formula

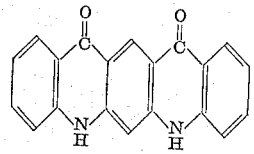

both of which may be substituted.

The unsubstituted parent compound of linear "quinacridone" is generally good in lightfastness as are many of the 2,9 disubstituted products, but the best of these show some degradation on prolonged exposure to light. Introduction of substituents in the 4 and 11 positions to obtain the yellower hues has invariably resulted in a serious loss of lightfastness.

Quinacridone and isoquinacridone are both yellow compounds which have been proposed for use as pigments. However, they are deficient in lightfastness and no significant improvement in lightfastness has resulted from the introduction of substituents.

U.S. Patent 3,160,510, issued Dec. 8, 1964, discloses that improved lightfastness may be achieved by the formation of solid solutions of two or more compounds of the quinacridone series. This procedure, however, has marked limitations since the ingredients are colored compounds which may detract from the color of the final composition.

Japanese Patent No. 110,746, issued in 1935, discloses a method of increasing the light resistance of pigments by introducing certain compounds of trivalent nitrogen which have the property of absorbing ultraviolet light. This patent mentions phenylene diamine as a useful agent but does not mention the nitrogen substituted derivatives thereof, and specifically excludes diphenylamine.

It is an object of this invention to provide quinacridone compounds of improved lightfastness. It is a further object of the invention to improve the lightfastness of quinacridone compounds without causing any degradation in the tinctorial properties. A further object is to provide a process for preparing such improved products.

These objects are accomplished as follows. It has now been found that solid solutions may be formed consisting essentially of a major amount of at least one quinacridone compound selected from the group consisting of:

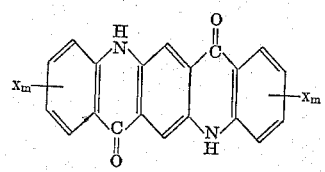

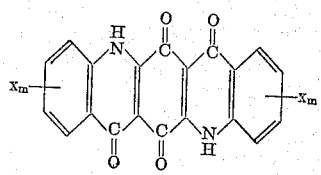

and

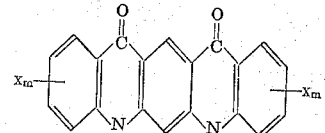

where $x$ is selected from the group consisting of fluorine, chlorine, bromine, a lower alkyl, a lower alkoxy and combinations of these groups and $m$ is an integer from 0 to 2, and a minor amount of certain N,N'-diaryl-diamino compounds especially N,N'-diphenyl-p-phenylenediamine. Such solid solutions generally offer improved lightfastness over the untreated quinacridone compound and the improvement is especially noteworthy with those quinacridones which are relatively poor in lightfastness in comparison to unsubstituted quinacridones.

The accompanying drawing shows the x-ray diffraction patterns of three of the products of Example III below and also of pure N,N'-diphenyl-p-phenylenediamine.

In a preferred embodiment of this invention, a quinacridone compound is ball milled with about 5% (based on the weight of the final product) of N,N'-diphenyl-p-phenylenediamine in the presence of a finely divided inorganic salt for a substantial period of time and the resulting solid solution of the diamine in the quinacridone is separated from the salt by solution of the latter and then isolated by conventional means.

In a more specific embodiment a mixture of 95 parts quinacridonequinone and 5 parts N,N'-diphenyl-p-phenylenediamine is charged to a suitable ball mill along with 900 parts of dry crystalline sodium chloride and milled for several days. The charge is then separated from the balls in the mill and extracted with boiling water (which may be acidified) to leave the solid solution of the diamine in the quinacridone-quinone as a yellow pigment of much improved lightfastness.

For a clearer understanding of the invention, the following specific examples are given. These examples are intended to be merely illustrative of the invention and not in limitation thereof. Unless otherwise specified, all parts are by weight.

EXAMPLE I (A) A ball mill of approximately one liter capacity is charged with 1800 grams of grinding elements comprising a mixture of ½ inch and ¼ inch steel balls together with 150 grams of roofing nails (which aid in preventing caking of the charge). The mill is then charged with 180 grams of dried crystalline sodium chloride and 20 grams of crude linear quinacridone (made according to the process of U.S. Patent 2,821,529) to which is added 1.05 grams of N,N'-diphenyl-p-phenylenediamine. The mill is rotated at about 70% of the critical speed (the speed at which centrifugal force retains the charge against the periphery of the mill) for 5 days at room temperature. The charge of salt and pigment is separated from the grinding elements and added to about 2 liters of water whereupon the slurry is boiled for about 1 hour, filtered, washed free of soluble salts and dried at 60° C.

(B) For purposes of comparison, a similar charge is milled using 20 grams of crude quinacridone without the added N,N'-diphenyl-p-phenylenediamine.

Samples of the two pigments made in this manner were dispersed by conventional means in a baking type alkyd resin vehicle. Test panels in the full shade color (masstone) were made from the resulting enamels by spraying suitably prepared metal panels therewith and drying by baking. Portions of the enamels were then converted to metallic enamels by adding aluminum powder in the ratio of 5 parts aluminum per 95 parts pigment and panels were made therefrom. Other portions of the enamels were diluted with an enamel of $TiO_2$ to give tint enamels containing 10 parts pigment per 90 parts $TiO_2$, on the one hand, as well as 1 part pigment per 99 parts $TiO_2$, on the other hand, and panels were made from these several enamels.

All of these panels were then exposed at 45° to the sun in Florida for 6 months and the following table summarizes the exposure results in a numerical scale where 10 indicates no change and 0 is complete failure, $d$=darken and $f$=fade.

|   | MT | Metallic 5/95 | 10/90 Tint | 1/99 Tint |
|---|---|---|---|---|
| A | 8d | 9d | 8f | 7.5f |
| B | 4d | 7d | 6d | 7.0f |

Before exposure the panels of A and B were essentially alike in color at each level of pigmentation.

The pigments are further characterized by their X-ray diffraction patterns. Alpha quinacridone is known to exhibit an X-ray diffraction pattern characterized by two strong lines with interplanar spacings of 3.45 A. and 3.19 A., a third line of similar intensity with an interplanar spacing 14.24 A., two lines of moderate intensity with interplanar spacings of 6.32 A., and 7.13 A., and two weak lines with interplanar spacings of 5.30 A. and 4.27 A. N,N'-diphenyl-p-phenylenediamine exhibits an X-ray diffraction pattern with three strong lines at interplanar spacings of 3.78 A., 4.44 A. and 12.98 A., two lines of moderate intensity with interplanar spacings of 3.23 A. and 4.79 A. and five weak lines at 3.63 A., 4.04 A., 4.90 A., 5.06 A. and 6.45 A. The X-ray diffraction pattern of product A above is essentially that of alpha phase quinacridone with no evidence of the lines of N,N'-diphenyl-p-phenylenediamine. It is believed that the latter compound has entered the crystal lattice of the alpha quinacridone to form a solid solution therewith.

EXAMPLE II (A) A mixture of 20 grams of quinacridonequinone (which may be made by reacting 3 mols of benzoquinone with 2 mols of anthranilic acid in boiling alcohol, separating the yellow crystalline solid and cyclizing in hot concentrated sulfuric acid and recrystallizing from concentrated sulfuric acid) and 1.05 grams N,N'-diphenyl-p-phenylenediamine is milled under the same conditions described in Example I-A and similarly extracted and dried to give a relatively bright yellow pigment.

(B) As a control to the above, 20 grams of quinacridonequinone is milled and extracted in the absence of any added N,N'-diphenyl-p-phenylenediamine.

Enamels were made from these pigments as described in Example I and panels of the metallics and two levels of tints have been exposed in Florida for 6 months. The results are as follows:

|   | Metallic 5/95 | 10/90 Tint | 1/99 Tint |
|---|---|---|---|
| A | 8.5d | 5f | 6f |
| B | 3d | 0 | 0 |

The X-ray diffraction patterns of A and B are alike and the colors of the enamels of comparable pigmentation are alike.

EXAMPLE III

A ball mill, which is loaded to about 60% of its volume when completely charged, is loaded with grinding elements comprising 1500 parts of steel balls (mixture of ½ inch and ¼ inch balls) and 150 parts of roofing nails. Successive millings are then charged with crude quinacridonequinone and N,N'-diphenyl-p-phenylenediamine in the amounts set forth below together with 135 parts of aluminum sulfate [$Al_2(SO_4)_3 \cdot 18H_2O$] and 4.0 parts of tetrachloroethylene.

|   | Quinacridonequinone | N,N'-diphenyl-p-phenylenediamine |
|---|---|---|
| A | 16.0 | |
| B | 15.2 | 0.8 |
| C | 14.4 | 1.6 |

The charges are milled for about 2 days at about 70% of critical speed at room temperature. After separation from the grinding balls, the powder is slurried in 2000 parts of water containing 68 parts concentrated sulfuric acid and the slurry is boiled for 2 hours. The pigment is isolated by filtering, washing free of soluble salts and drying at about 60° C. to give a quantitative yield of a somewhat yellow powder in each case.

For comparative purposes, product D is prepared by physically mixing (prolonged tumbling in the absence of any grinding elements) 90 parts of A (quinacridonequinone) and 10 parts of N,N'-diphenyl-p-phenylenediamine.

Products A, C and D together with a sample of pure N,N'-diphenyl-p-phenylenediamine have been characterized by X-ray diffraction patterns using CuK alpha radiation, and the patterns are summarized in Table I which shows both the diffraction angles ($2\theta$) and the interplanar spacings. For the purposes of conserving space, quinacridonequinone is abbreviated as QAQ and N,N'-diphenyl-p-phenylenediamine as DPD in Table I. In addition, I.S. is interplanar spacing, ints. is intensity, str. is strong, med. is medium, and wk. is weak. The patterns are also shown in idealized form as bar graphs in the accompanying drawing in which the horizontal axis is a linear scale of $2\theta$ using CuK alpha radiation and the vertical axis is an estimate of the intensity of the several lines. For convenience, the diffraction angles have been converted to their corresponding interplanar spacings expressed in Angstrom units and these are also listed along the horizontal axis. It is to be remembered that these values are plotted in idealized form and serve only as a convenient way of distinguishing a solid solution from a physical mixture for the products of this example.

It is apparent from Table I and from the accompanying drawing that the three strong lines of N,N'-diphenyl-p-phenylenediamine appear as medium to weak lines in the pattern of the physical mixture D but are completely absent from the pattern of Sample C, although the product can still be identified as present by a suitable extraction procedure, such as extraction with concentrated HCl, followed by precipitation from the filtrate and identification by the X-ray diffraction pattern, for instance. Moreover, all of the significant characteristic lines of quinacridonequinone appear in the patterns of both Samples C and D. Thus, the X-ray pattern of C, being essentially the pattern of quinacridonequinone, together with the evidence that N,N'-diphenyl-p-phenylenediamine is actually present, leads to the conclusion that the N,N'-diphenyl-p-phenylenediamine has entered the crystal lattice of quinacridonequinone as a solid solution as a result of the milling step.

The several products of this example are further characterized by dispersion in a vehicle at various pigmentation levels as set forth in some detail in Example I. Panels coated with the various enamels have been compared for color and for durability. At any given pigmentation level, the four pigments yield essentially equivalent color except for a slight weakness in the tints from Sample D. Samples A and D are essentially alike in durability and decidedly inferior to Samples B and C. Sample C, in turn, is slightly inferior to Sample B suggesting that the optimum level of treatment is somewhat less than 10% N,N'-diphenyl-p-phenylenediamine.

pattern does not show the characteristic lines of N,N'-diphenyl-p-phenylenediamine.

EXAMPLE VI 20 parts of quinacridonequinone and 2 parts of N,N'-dimethyl-N,N'-diphenyl-p-phenylenediamine are milled together under the conditions described in Example IA and similarly extracted and dried to give a relatively bright yellow pigment. The x-ray diffraction patterns show no evidence of the presence of the agent and are thus indicative of the formation of a solid solution. When enamels are made from this pigment and exposed on suitable panels for 6 months in Florida, there is striking evidence of an improvement in durability.

The methyl groups in the agent of this example may be replaced with other alkyl groups up to 3 carbon atoms (ethyl and propyl) to give similar improvements.

EXAMPLE VII

The following related compounds may be used as the agent in the process of Example VI with essentially equilvalent results:

(a) N,N'-di(2-naphthyl)-p-phenylenediamine.

TABLE I

| Product A, QAQ | | | DPD | | | Product C, Solid Solution, 90% QAQ–10% DPD | | | Product D, Physical Mixture, 90% QAQ–10% DPD | | |
| --- | --- | --- | --- | --- | --- | --- | --- | --- | --- | --- | --- |
| $2\theta$ | I.S. | Ints. | $2\theta$ | I.S. | Ints. | $2\theta$ | I.S. | Ints. | $2\theta$ | I.S. | Ints. |
| 8.8 | 10.0 | Str. | 6.8 | 12.98 | Str. | 8.6 | 10.3 | Str. | 6.8 | 12.98 | Med. |
| 14.1 | 6.27 | Med. | 13.7 | 6.45 | Wk. | 14.1 | 6.27 | Str. | 8.8 | 10.0 | Str. |
| 17.7 | 5.01 | Wk. | 17.5 | 5.06 | Wk. | 17.4 | 5.09 | Wk. | 14.1 | 6.27 | Med. |
| 18.7 | 4.74 | Wk. | 18.1 | 4.90 | Wk. | 18.5 | 4.79 | Wk. | 17.7 | 5.01 | Wk. |
| 21.3 | 4.17 | Wk. | 18.5 | 4.79 | Med. | 21.2 | 4.19 | Wk. | 18.7 | 4.74 | Wk. |
| 22.1 | 4.02 | Wk. | 20.0 | 4.44 | Str. | 22.0 | 4.04 | Wk. | 20.1 | 4.41 | Med. |
| 23.8 | 3.74 | Wk. | 22.0 | 4.04 | Wk. | 24.4 | 3.65 | Str. | 21.3 | 4.17 | Wk. |
| 24.4 | 3.65 | Str. | 23.5 | 3.78 | Str. | 25.6 | 3.48 | Str. | 22.1 | 4.02 | Wk. |
| 25.6 | 3.48 | Str. | 24.5 | 3.63 | Wk. | 27.0 | 3.30 | Str. | 23.6 | 3.77 | Wk. |
| 27.2 | 3.28 | Str. | 27.6 | 3.23 | Med. | | | | 24.4 | 3.65 | Str. |
| | | | | | | | | | 25.6 | 3.48 | Str. |
| | | | | | | | | | 27.2 | 3.28 | Str. |

EXAMPLE IV

Isoquinacridone is prepared by condensing 2 mols of formanilide with 1 mol of dimethyl 4,6-dibromoisophthalate in the presence of potassium carbonate and cupric acetate to give, after suitable hydrolysis and acidification, 4,6-dianilinoisophthalic acid (U.S. Patent 3,153,667, issued Oct. 20, 1964). This compound, after isolation is cyclized in hot polyphosphoric acid to give isoquinacridone which is recovered in a conventional manner.

19 parts of isoquinacridone and 1.0 part of N,N'-diphenyl-p-phenylenediamine are milled together with 180 parts of crystalline sodium chloride in the ball mill of Example I and the resulting pigment isolated by extraction of the soluble salt as more fully described in said Example I, using, however, 4% sulfuric acid in place of pure water. The product is a yellow pigment of attractive properties. It shows very much improved lightfastness in comparison to the known poor lightfastness of pure isoquinacridone. The X-ray pattern is substantially that of pure isoquinacridone with no evidence of the characteristic lines of N,N'-diphenyl-p-phenylenediamine.

EXAMPLE V 15.2 parts of 4,11-dichloroquinacridone and 0.8 part of N,N'-diphenyl-p-phenylenediamine are milled together with 135 parts of aluminum sulfate and 4.0 parts of tetrachloroethylene and the pigment isolated as described in detail in Example III. The resulting pigment is substantially the same color and exhibits the same strength as the untreated 4,11-dichloroquinacridone but there is a remarkable improvement in lightfastness. The X-ray (b) Indolo(3,2b)carbazole.
(c) N,N'-diphenyl-alpha,alpha'-diamino-p-xylene.

The preferred agent and those of Example VI and VIIa are all included in the following structural formula:

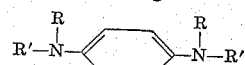

where R is hydrogen, methyl, ethyl or propyl and R' is phenyl or 2-naphthyl.

The product of Example VIIb has the structural formula:

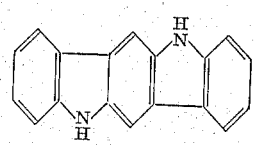

which can be visualized as having been formed by the cyclization between the terminal phenyl groups of N,N'-diphenyl-p-phenylenediamine and the central phenylene group.

The compound of VIIc has the formula:

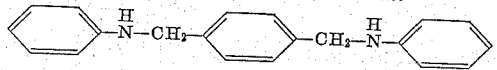

and is obviously of related structure.

The examples have shown the invention as applicable for improving the lightfastness of alpha phase quinacridone, of 4,11-dichloroquinacridone, of quinacridonequinone and of isoquinacridone, all known to be deficient in lightfastness. However, the invention is applicable to the treatment of a wide variety of substituted products within this broad series, the improvement in lightfastness being most notable where the deficiency is greatest but being perceptible in all cases. The following are additional typical quinacridone compounds which may be treated to advantage but this list is not intended to be in any way limiting:

4,11-difluoroquinacridone
4,11-dimethylquinacridone
2,9-difluoroquinacridone
2,9-dichloroquinacridone
2,9-dibromoquinacridone
2,4,9,11-tetrachloroquinacridone
2,4,9,11-tetrafluoroquinacridone
4,11-dimethylquinacridone
2,9-dimethylquinacridone
2,4,9,11-tetramethylquinacridone
2,9-dimethoxyquinacridone
2,9-diethoxyquinacridone
3,10-dichloroquinacridone
3,10-dimethylquinacridone
4,11-difluoroquinacridonequinone
4,11-dichloroquinacridonequinone
2,9-dichloroquinacridonequinone
2,9-dimethylquinacridonequinone
2,9-dimethoxyquinacridonequinone
2,10-dichloroisoquinacridone
2,10-dimethylisoquinacridone
4,8-dichlorisoquinacridone.

Other substituents may be used including the lower alkyl and alkoxy groups containing up to 3 carbon atoms.

The examples have shown a variation in the amount of N,N'-phenyl-p-phenylenediamine used to form the solid solution, with a preference for an amount of about 5%. It appears that the optimum improvement in lightfastness is obtained when the solid solution contains from 5% to 10% of the diamine. Nevertheless, amounts as low as 1% show perceptible improvements as do amounts over 10% up to about 15%. Since the higher amounts do not confer any advantage over amounts in the range of 5% to 10% and they do have a disadvantage of diluting the color, they are not preferred but are permissible within the concept of the invention.

The introduction of molecules of N,N'-diphenyl-p-phenylenediamine into the crystal lattice of a quinacridone compound to form a solid solution is readily accomplished in a ball milling operation in the presence of a dry crystalline inorganic salt, this being a well known process commonly called "salt milling." There are many variations of this process which are not critical to the invention but do influence the efficiency of the operation. The nature of the salt may vary widely. One commonly used salt is sodium chloride (see Example I). The salt used in another example is hydrated aluminum sulfate. Other salts which may be used include sodium sulfate, ammonium chloride, ammonium sulfate, the corresponding potassium and calcium salts and the like. It is generally accepted that there should be at least 4 parts of salt per part of pigment with some preference for about 9 to 10 parts of salt per part of pigment. Higher amounts may be used but offer no advantage in results and, hence are not preferred.

Another variation that has been used to advantage on occasion in salt milling is the introduction of a small amount of an organic solvent into the ball mill charge. The amount of the solvent should be such that the charge retains its dry appearance throughout and is commonly in the range of 2% to 4% of the weight of the combined charge of pigment and salt. The nature of the solvent is not critical but, from the standpoint of safety, it is desirable that it be nonflammable. For this reason, the preferred solvents are found in the group of chlorinated aliphatic and aromatic hydrocarbons, such as carbon tetrachloride, tetrachloroethylene, o-dichlorobenzene and trichlorobenzene. If suitable precautions with respect to flammability are exercised, simple hydrocarbons, such as benzene, toluene or xylene are also useful, as well as certain polar solvents, such as dimethyl formamide, dimethyl sulfoxide, and tetramethylene sulfone.

It is also common in the salt milling process to introduce a surface active agent to improve the efficiency of the process. The nature and the amount of surface active agent are not critical although it is often preferred that the agent be non-ionic and that it be used in small amounts, say approximately 5% of the weight of the pigment being milled.

The isolation of the pigment from the salt used in the milling operation is entirely conventional. In its simplest form, the essential step is to dissolve the salt in hot water and to filter the pigment from the salt solution. In practice, it is common to use dilute aqueous acid (HCl or $H_2SO_4$) in this dissolving action as a means of further purifying the pigment and especially for dissolving tiny bits of metal which may be abraded from the grinding elements and the inner surface of the ball mill.

Although the salt milling process is a very effective and preferred process for making the solid solutions of this invention, it is not intended to exclude other means of forming such solid solutions. Prolonged refluxing in suitable organic solvents, such as dimethylformamide, dimethyl sulfoxide, tetramethylene sulfone and the like, may result in recrystallization of the quinacridone compound and the introduction of the treating agent into the crystal lattice.

This invention is useful in making available a wide range of quinacridone compounds as pigments of superior lightfastness.

The principal advantage of this invention is the preparation of quinacridone products of improved lightfastness. An added advantage is that the improved lightfastness is obtained without any significant change in the color of the original quinacridone compound.

What is claimed is:
1. A solid solution consisting essentially of at least one quinacridone compound selected from the group of compounds having the structural formulas

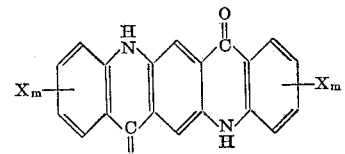

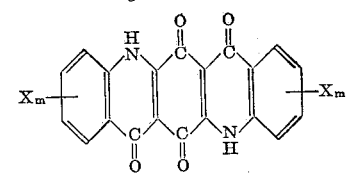

and

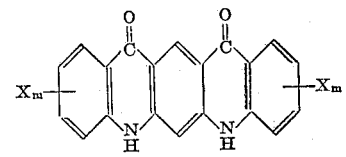

wherein $x$ is selected from the group consisting of fluorine, chlorine, bromine, a lower alkyl, a lower alkoxy and combinations of these and $m$ is an integer from zero to two, and from about 1 to about 15% of the total solid solution of an agent selected from the group of compounds having the structural formulas

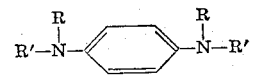

wherein R is selected from hydrogen and an alkyl group having up to 3 carbon atoms and R' is selected from phenyl and 2-naphthyl,

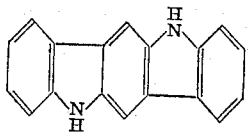

and

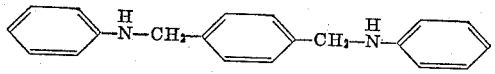

said solid solution being characterized by an X-ray diffraction pattern different from the sum of the X-ray diffraction patterns of the components, and said solid solution being further characterized as exhibiting a degree of light-fastness superior to that of the quinacridone compound alone.

2. The solid solution of claim 1 wherein the agent is N,N'-diphenyl-p-phenylenediamine and is present in an amount comprising from about 1 to about 15% of the total solid solution.

3. The solid solution of claim 2 wherein the amount of N,N'-diphenyl-p-phenylenediamine comprises from about 5 to about 10% of the total solid solution.

4. The solid solution of claim 1 wherein the quinacridone compound has the formula

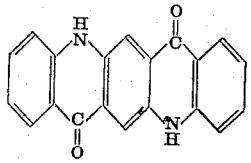

5. The solid solution of claim 4 wherein the agent is N,N'-diphenyl-p-phenylenediamine and is present in an amount comprising from about 1 to about 15% of the total solid solution.

6. The solid solution of claim 5 wherein the amount of N,N'-diphenyl-p-phenylenediamine comprises from about 5 to about 10% of the total solid solution.

7. The solid solution of claim 1 wherein the quinacridone compound has the formula

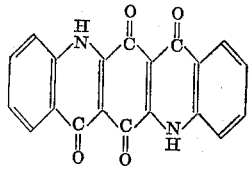

8. The solid solution of claim 7 wherein the agent is N,N'-diphenyl-p-phenylenediamine and is present in an amount comprising from about 1 to about 15% of the total solid solution.

9. The solid solution of claim 8 wherein the amount of N,N'-diphenyl-p-phenylenediamine comprises from about 5 to about 10% of the total solid solution.

10. The solid solution of claim 1 wherein the quinacridone compound has the formula

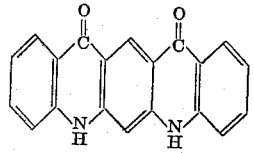

11. The solid solution of claim 10 wherein the agent is N,N'-diphenyl-p-phenylenediamine and is present in an amount comprising from about 1 to about 15% of the total solid solution.

12. The solid solution of claim 11 wherein the amount of N,N'-diphenyl-p-phenlenediamine comprises from about 5 to about 10% of the total solid solution.

References Cited

UNITED STATES PATENTS

| | | | |
|---|---|---|---|
| 3,160,510 | 12/1964 | Ehrich | 106—288 |
| 3,259,514 | 7/1966 | Wilkinson | 106—309 |
| 3,298,847 | 1/1967 | Hanke et al. | 106—288 |

TOBIAS E. LEVOW, *Primary Examiner.*

J. E. POER, *Assistant Examiner.*